United States Patent
Aggarwal et al.

(10) Patent No.: US 10,904,477 B2
(45) Date of Patent: Jan. 26, 2021

(54) DEVICE IDENTIFICATION USING MEDIA DEVICE KEYS

(71) Applicant: Caavo Inc, Milpitas, CA (US)

(72) Inventors: Ashish D. Aggarwal, Stevenson Ranch, CA (US); Sharath H. Satheesh, Bangalore (IN); Conrad Savio Jude Gomes, Salcete (IN); Bitto Niclavose, Kottayam (IN)

(73) Assignee: Caavo Inc, Milpitas, CA (US)

( * ) Notice: Subject to any disclaimer, the term of this patent is extended or adjusted under 35 U.S.C. 154(b) by 0 days.

(21) Appl. No.: 16/250,791

(22) Filed: Jan. 17, 2019

(65) Prior Publication Data
US 2019/0230406 A1 Jul. 25, 2019

(30) Foreign Application Priority Data
Jan. 19, 2018 (IN) .............................. 201841002345

(51) Int. Cl.
| | | |
|---|---|---|
| *H04N 7/025* | (2006.01) | |
| *H04N 5/63* | (2006.01) | |
| *H04N 5/44* | (2011.01) | |
| *H04N 7/10* | (2006.01) | |
| *H04N 21/442* | (2011.01) | |
| *G09G 5/00* | (2006.01) | |
| *H04N 21/4363* | (2011.01) | |
| *H04N 21/4367* | (2011.01) | |

(52) U.S. Cl.
CPC .............. *H04N 7/025* (2013.01); *G09G 5/00* (2013.01); *H04N 5/44* (2013.01); *H04N 5/63* (2013.01); *H04N 7/10* (2013.01); *H04N 7/104* (2013.01); *H04N 21/4367* (2013.01); *H04N 21/43635* (2013.01); *H04N 21/44227* (2013.01); *H04N 21/44231* (2013.01)

(58) Field of Classification Search
None
See application file for complete search history.

(56) References Cited

U.S. PATENT DOCUMENTS

| | | |
|---|---|---|
| 8,127,059 B1 | 2/2012 | Carr et al. |
| 9,021,151 B2 | 4/2015 | Yagi |
| 9,232,265 B2 | 1/2016 | Maxwell et al. |
| 2002/0133646 A1 | 9/2002 | Cheung et al. |
| 2004/0148460 A1 | 7/2004 | Steinmetz et al. |
| 2008/0133779 A1 | 6/2008 | Ho et al. |
| 2009/0103362 A1 | 4/2009 | Pekny et al. |
| 2009/0137318 A1 | 5/2009 | Russo et al. |
| 2010/0185808 A1 | 7/2010 | Yu et al. |
| 2011/0016267 A1 | 1/2011 | Lee et al. |

(Continued)

*Primary Examiner* — Samira Monshi
(74) *Attorney, Agent, or Firm* — Fiala & Weaver P.L.L.C.

(57) ABSTRACT

Methods, systems, and apparatuses are described for identifying devices coupled a media device hub. A device map in the media device hub may create a map entry that associates a first device, a port to which the first device was at least previously coupled, and a first key of the first device. A second key is obtained from a media device that is coupled to a current port of the media device hub. A determination is made whether the second key is the same as the first key stored in the device map. If the first and second keys are the same, a determination is made whether the current port to which the second device is coupled is different than the port indicated in the device map. If the current port is different than the indicated port, the device map is updated to indicate the first device as coupled to the current port.

20 Claims, 6 Drawing Sheets

(56) References Cited

U.S. PATENT DOCUMENTS

| | | |
|---|---|---|
| 2011/0153910 A1 | 6/2011 | Mackenna et al. |
| 2012/0324147 A1 | 12/2012 | Lai |
| 2013/0325998 A1 | 12/2013 | Hormuth et al. |
| 2014/0040550 A1 | 2/2014 | Nale et al. |
| 2014/0149607 A1 | 5/2014 | Shim et al. |
| 2017/0039162 A1 | 2/2017 | Mishra et al. |
| 2019/0230318 A1 | 7/2019 | Aggarwal et al. |

| Port | Device | Key |
|---|---|---|
| 1 | Source Device A | A123 |
| 2 | Source Device B | B456 |
| 3 | Source Device C | C789 |
| 4 | [Empty] | [Empty] |

| Port | Device | Key |
|---|---|---|
| 1 | [Empty] | [Empty] |
| 2 | Source Device C | C789 |
| 3 | Source Device A | A123 |
| 4 | Source Device B | B456 |

DEVICE IDENTIFICATION USING MEDIA DEVICE KEYS

CROSS-REFERENCE TO RELATED APPLICATIONS

This application claims foreign priority to Indian Patent Application No. 201841002345, filed on Jan. 19, 2018, the entirety of which is incorporated by reference herein.

BACKGROUND

Technical Field

The subject matter described herein relates to the automatic identification of a media device using device keys.

Description of Related Art

An entertainment system may comprise several audio/video (AV) devices connected to a television (TV), such as a high definition TV (HDTV). These devices may include, for example, a cable/satellite TV set top box (STB), an audio system, a Blu-ray® or DVD (digital versatile disc) player, a digital media adapter, a game console, a multimedia streaming device, etc. Most of these devices now come with a high-speed high-definition media interface (HDMI) to allow transfer of high resolution video and audio from a source device (e.g., Blu-ray® player, cable TV set top box, etc.) to a sink device (typically a television).

However, upon connecting the source device to the sink device, a user typically needs to manually identify (e.g., through a user interface) a brand, make, or model of the media device. For instance, a user may manually need to identify which devices are coupled to each port of the sink devices by inputting a name and/or performing other configuration steps. If a user disconnects the devices and reconnects them in a different manner, for instance, the user may need to completely reconfigure the sink device. With the increase in number of connected devices, the manual identification and reconfiguration can be cumbersome and time-consuming.

BRIEF SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and apparatuses are described for identifying devices coupled a media device hub. A device map in the media device hub may map together a first device, a port to which the first device was at least previously coupled, and a first key of the first device. A second key may be obtained from a media device that is coupled to a current port of the media device hub. A determination is made whether the second key is the same as the first key stored in the device map. If the first and second keys are the same, a determination is made whether the current port to which the second device is coupled is different from the port indicated in the device map. If the current port is different than the indicated port, the device map is updated to indicate the first device as coupled to the current port. In this manner, the movement of a device to a different port of a media device hub may be automatically determined and indicated, thereby enabling the media device to avoid manual reconfiguration steps as a result of the different coupling.

Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

FIGS. 4A and 4B depict illustrative device maps that include entries that each indicate a mapping between a port, a device, and a device key, according to embodiments.

Embodiments will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

Figure 1:
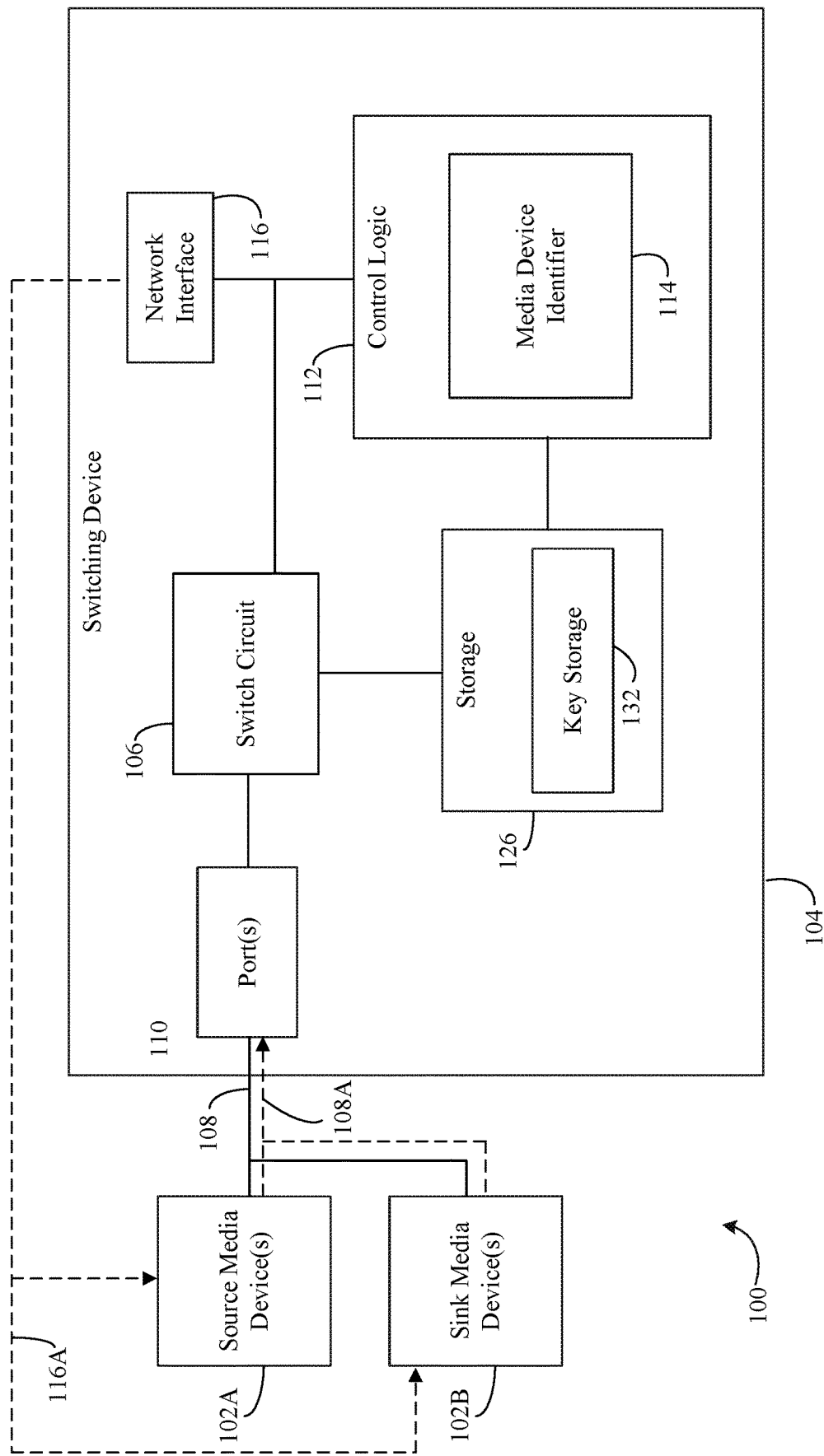
FIG. 1 is a block diagram of an example media system that includes a multimedia switching device in accordance with embodiments described herein.

The present specification discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," "front," "rear," etc.) used herein are for purposes of illustration only, and that practical implementations of the structures described herein can be spatially arranged in any orientation or manner.

Numerous exemplary embodiments are described as follows. It is noted that the section/subsection headings used herein are not intended to be limiting. Embodiments described in this document may be eligible for inclusion within multiple different sections or subsections. Furthermore, disclosed embodiments may be combined with each other in any manner.

II. Example Embodiments

An entertainment system may comprise several AV devices connected to a TV, such as a HDTV. These devices may include, for example, a cable/satellite TV STB, an audio system, a Blu-ray® or DVD player, a digital media adapter, a game console, a multimedia streaming device, etc. Most of these devices now come with a HDMI interface to allow transfer of high resolution video and audio from the source device (Blu-ray® player, cable TV set top box, etc.) to a sink device (a display device, which is typically a television).

However, upon connecting the source device to the sink device, a user typically needs to manually identify (e.g., through a user interface) a brand, make, or model of the media device. For instance, a user may manually need to identify which devices are coupled to each port of the sink devices by inputting a name and/or performing other configuration steps. If a user disconnects the devices and reconnects them in a different arrangement, for instance, the user may need to completely reconfigure the sink device. With the increase in number of connected devices, the manual identification and reconfiguration can be cumbersome and time-consuming.

Techniques are described herein to enable the automatic identification of a media device using a key obtained from the device. High-bandwidth Digital Content Protection (HDCP) information may be utilized to recognize a known source device (e.g., a source media device that has previously been identified). For instance, a media device hub, such as any media device that comprises a plurality of multimedia ports for retrieving multimedia content (may be provided with a device map that maps each of the devices coupled to the device, the ports to which each device is coupled, and a key obtained from the device. In some examples, the key may comprise a HDCP key that is obtained from a coupled source media device over an HDMI interface. For instance, the media device hub may obtain such a key, such as an A-key, a transmitter Key Selection Vector (KSV), an AKSV, or any other type of key, from the known media device and store the key in the device map. If the media device is later disconnected and reconnected (to the same port, or any other port of the media device), the media device hub may obtain a key from the media device during a handshake process and identify the device by matching the obtained key with a key stored in the device map. In this manner, it may be easily determined whether a source device was previously coupled to the media device hub. Furthermore, because the port to which the source device was previously coupled is also stored in a device map, the movement of the source device to a different multimedia port may also be easily determined.

Furthermore, upon determining that a device was previously coupled to the media device hub, the media device hub may thereby update the device map to identify the current port to which the media device is coupled. As a result, if multimedia content is requested to be retrieved from the media device, the media device hub may be configured to automatically select the current port (rather than a previously indicated port), to retrieve the desired multimedia content. In this manner, manual reconfiguration of the media device is not necessary, and the media device hub may operate seamlessly even though the coupling to the media device has been altered.

FIG. 1 is a block diagram of a media system 100 that is configured to automatically identify a media device based on a media device key in accordance with an embodiment. As shown in FIG. 1, system 100 includes one or more source media device(s) 102A, one or more sink media devices 102B, and a switching device 104. As shown in FIG. 1, switching device 104 includes one or more AV ports 110, a switch circuit 106, control logic 112, a network interface 116, and a storage 126. Switching device 104 includes any type of media device hub, such as a multimedia switching device, an AVR, a repeater, or any other device that may comprise a media device hub or may operate as a hub for media devices or other devices. For instance, a media device hub as used herein may include a plurality of input and/or output AV ports and be operable to select an appropriate input and/or output port based on a selection (e.g., a user selection). An example of switching device 104 that may implement, or be adapted to implement, techniques described herein include, but is not limited to Control Center®, available from Caavo Inc. In some other examples, a media device hub may also include one or more sink or source devices that comprise a plurality of AV ports such that the device can switch an input and/or output port based on a selection. Control logic 112 includes a media device identifier 114. Media system 100 and its components are described in detail as follows.

In the illustrative example shown in FIG. 1, source media device(s) 102A may include source devices configured to provide audio and/or video signals. For instance, source media device(s) 102A may include a multimedia device, such as a Blu-ray® player, a STB, a streaming media player (e.g., a Roku® streaming media device, etc.), or any other device that is configured to provide audio and/or video content for playback on another device. Sink media device(s) 102B may include sink devices configured to receive audio and/or video signals, such as a television or a projector. As used herein, a sink device may also comprise one or more other devices, such as a media device hub, that may act as an intermediate device by receiving audio and/or video content from a source device and provide such content to another device (e.g., a TV) for playback. In another example, certain source devices (e.g., STBs, gaming consoles, etc.) may also act as AV repeaters such that those devices may receive AV content from source device and transmit it to sink device for playback (e.g., by passing through the AV content). The types of media devices mentioned herein are only illustrative, and source and sink media device(s) 102A and 102B may respectively be any electronic device capable of providing or playing AV signals.

As further shown in FIG. 1, source media devices 102A and/or sink media device(s) 102B is/are coupled to AV port(s) 110. In embodiments, source media devices 102A and/or sink media device(s) 102B may be coupled to AV port(s) 110 via a multimedia cable such as an HDMI cable 108. It is noted, however, that implementations are not limited to coupling devices as shown in FIG. 1 using an HDMI cable, but may comprise other types of multimedia cables, including standard definition cables, coaxial cables, USB (Universal Serial Bus) cables, Digital Video Interface (DVI) cables, DisplayPort interface cables, and wireless AV interfaces. Port(s) 110 may be further configured to receive control information or other information apart from audio and/or video content, such a device key 108A. In some embodiments, source media device(s) 108A may comprise HDCP-compliant devices, and device key 108A received from one or more of such devices may comprise an HDCP key, such as a KSV, received from an HDCP transmitter of the source device. It is noted that implementations are not limited to the exchange of HDCP keys, but may include transmitting and/or receiving any other types of keys, including but not limited to a security key, an encryption key, a device signature, and/or a device identifier.

AV port(s) 110 may be automatically configured to be source AV ports or sink AV ports upon connecting electronic device(s) to AV port(s) 110. In accordance with embodiments, switching device 104 may act as either a source media device or a sink media device. For instance, when switching device 104 is configured to receive AV signals from one of source media device(s) 102A (e.g., via HDMI cable 108), switching device 104 may act as an HDMI sink device. Furthermore, when switching device 104 is configured to transmit AV signals to one of sink media device(s) 102B (e.g., via HDMI cable 108), switching device 104 may act as an HDMI source device in accordance with embodiments.

Switch circuit 106 may be configured to internally couple a particular source AV port (e.g., one of AV port(s) 110) to a particular one or more sink AV ports (e.g., another one of AV port(s) 110) based, for instance, on a user command Additional details regarding the auto-configuration of AV port(s) may be found in U.S. patent application Ser. No. 14/945,079, filed on Nov. 18, 2015 and entitled "Auto Detection and Adaptive Configuration of HDMI Ports," the entirety of which is incorporated by reference. Furthermore, additional details regarding the identification of electronic device(s) and the mapping of electronic device(s) to AV port(s) may be found in U.S. patent application Ser. No. 14/945,125, filed on Nov. 18, 2015 and entitled "Automatic Identification and Mapping of Consumer Electronic Devices to Ports on an HDMI Switch," the entirety of which is incorporated by reference.

System 100 may further comprise a receiver (not shown in FIG. 1) configured to receive command(s) that indicate that a user would like to use one or more of media device(s) 102A or 102B for providing and/or presenting content. In accordance with an embodiment, the receiver may receive control signals via a wired connection (e.g., via a Universal Serial Bus (USB) cable, a coaxial cable, etc.). In accordance with another embodiment, the control signals are transmitted via a wireless connection (e.g., via infrared (IR) communication, radio frequency (RF) communication (e.g., Bluetooth™, as described in the various standards developed and licensed by the Bluetooth™ Special Interest Group, technologies such as ZigBee® that are based on the IEEE 802.15.4 standard for wireless personal area networks, near field communication (NFC), other RF-based or internet protocol (IP)-based communication technologies such as any of the well-known IEEE 802.11 protocols, etc.) and/or the like.

In accordance with an embodiment, a control device (not shown in FIG. 1) may transmit control signals to the receiver. For example, the control device may be a remote-control device, a desktop computer, a mobile device such as a telephone (e.g., a smart phone and/or mobile phone), a personal data assistance (PDA), a tablet, a laptop, etc. In accordance with another embodiment, the control device is a dedicated remote-control device including smart features such as those typically associated with a smart phone (e.g., the capability to access the Internet and/or execute variety of different software applications), but without the capability of communicating via a cellular network.

A user may use the control device to select a source device and/or a sink device that the user would like to use for providing and/or presenting content. After making a selection, the control device may transmit a command to the receiver that includes an identifier of the selected source and/or sink devices. The identifier may include, but is not limited to, the type of the electronic device (e.g., a Blu-ray player, a DVD player, a set-top box, a streaming media player, a TV, a projector etc.), a brand name of the electronic device, a manufacturer of the electronic device, a model number of the electronic device, and/or the like.

The receiver may also be configured to receive one or more voice commands from a user that indicate one or more electronic device(s) (e.g., source media devices and/or sink media device(s) 102B) that a user would like to use for providing and/or presenting content. For example, the user may utter one or more commands or phrases that specify electronic device(s) that the user would like to use (e.g., "Watch DVD," "Watch satellite TV using projector," "Turn on streaming media device"). The command(s) may identify electronic device(s) by one or more of the following: a type of the electronic device, a brand name of the electronic device, a manufacturer of the electronic device, a model number of the electronic device and/or the like. In accordance with an embodiment, the receiver may comprise a microphone configured to capture audio signals. In accordance with such an embodiment, the receiver and/or another component of switching device 104 is configured to analyze audio signals to detect voice commands included therein. In accordance with another embodiment, the microphone is included in the control device. In accordance with such an embodiment, the control device is configured to analyze the audio signal received by the microphone to detect voice command(s) included therein, identify the electronic device(s) specified by the user, and/or transmit command(s) including identifiers for the identified electronic device(s) to the receiver. After receiving such command(s), receiver provides the identifier(s) included therein to a mapping component (e.g., in a storage device 126, discussed later) in or accessible to control logic 112 that may enable control logic 112 to automatically identify a port to which the electronic device(s) is coupled. Based on the identifier(s) in the mapping component, control logic 112 may be configured to provide a control signal to switch circuit 106, which causes switch circuit 106 to connect the identified source AV port to the identified and/or determined sink AV port so that multimedia content may be retrieved and/or presented appropriately.

Switching device 104 may be further configured to transmit a control signal to any of source or sink media device(s) 102A or 102B. The control signal may be any type of signal to control one or more source or sink media device(s) 102A or 102B, such as a signal to control a power state, an input, an output, an audio setting, a video setting, or any other setting of source or sink media device(s) 102A or 102B. In embodiments, source and/or sink media device(s) 102A and/or 102B may be configured to receive control signals via any one or more communication protocols. For example, as shown in FIG. 1, switching device 104 may transmit to source or sink media device(s) 102A or 102B an IP control signal 116A via a network interface 116, or a control signal using any other suitable interface (not shown), such as an IR control signal, an RF control signal, or a control signal via an HDMI Consumer Electronics Control (HDMI-CEC) protocol over HDMI interface 108.

Network interface 116 is configured to enable switching device 104 to communicate with one or more other devices (e.g., source or sink media device(s) 102A or 102B) via a network, such as a local area network (LAN), wide area network (WAN), and/or other networks, such as the Internet. In accordance with embodiments, network interface 116 may transmit an IP control signal 116A over the network to control one or more functions of source or sink media device(s) 102A or 102B. Network interface 116 may include any suitable type of interface, such as a wired and/or wireless interface. In embodiments, network interface 116 may further enable switching device 104 with two-way communication with one or more remote (e.g., cloud-based) systems (not shown in FIG. 1).

Storage 126 may be one or more of any storage device described herein, such as, but not limited to, those described below with respect to FIG. 7. Storage 126 may include a key storage 132 as shown in FIG. 1. Key storage 132 may be configured to store keys received from one of source media device(s) 102A upon connection to switching device 104 and/or during a handshake process, as described later. In some examples, key storage 132 may also comprise a device map, as described later. Upon coupling one of source media device(s) 102A to switching device 104 (e.g., via an HDMI cable) or during a handshake process, HDCP information that may include one or more device keys (e.g., a KSV) may be exchanged between two HDCP-compliant devices. Upon receiving the KSV from one of source media device(s) 102A, the received KSV may be stored in key storage 132, along with the identity of the media device from which the HDCP information was received and the port (i.e., one of port(s) 110) to which the media device is coupled in a device map. The identity of the source media device, such as a device name, a model, number, etc., may be determined in any suitable manner. For instance, additional details regarding the identification of media device(s) may be found in U.S. patent application Ser. No. 14/945,125, filed on Nov. 18, 2015 and entitled "Automatic Identification and Mapping of Consumer Electronic Devices to Ports on an HDMI Switch," the entirety of which is incorporated by reference. In another embodiment, the identity of the media device from which the HDCP information was received may be received and/or modified via a user input (e.g., through a suitable user interface). Key storage 132 may include any suitable data structure (e.g., a table/database, or the like) that correlates a particular KSV with a device identifier and a port from which the KSV was received. In embodiments, key storage 132 may be stored either locally within one of storage(s) 126 and/or remotely (e.g., on a cloud-based server).

Control logic 112 may include media device identifier 114 configured to automatically identify a media device using device keys obtained from source media devices. For instance, by referencing one or more stored keys in key storage 132, media device identifier 114 may automatically determine whether a device coupled to any of port(s) 110 was previously coupled to switching device 104 and determine whether the device is currently coupled to a different port indicated in a device map.

For example, a user may disconnect the source media device from a first port of switching device 104 and later reconnect the same source media device to another (e.g., a different) port of switching device 104. Upon coupling the source media device to switching device 104, the source media device and switching device 104 exchange HDCP information transmitted via the AV interface in a manner described herein. Because a key of the source media device (e.g., the A-key or AKSV) may be unique for a particular device, the same one of source media device(s) 102A (previously coupled to a first port) may transmit the same key despite being coupled to a second, or different, port of switching device 104. As a result, when the key is re-transmitted, even if the key is received via a different one of port(s) 110, media device identifier 114 may automatically determine that the source media device was previously coupled to switching device 104.

Implementations are not limited to any particular arrangement of media devices, and may comprise other arrangements not expressly shown in FIG. 1. For instance, any one or more of source device(s) 102A may be coupled to switching device 104 via one or more intermediate devices, such as another media device hub or any other type of device (e.g., a TV or a STB in some instances) that may comprise a plurality of AV ports. Furthermore, media device identifier 114 need not be implemented in a switching device as shown in FIG. 1, but may be implemented in any device that is configured to be coupled to a source media device (directly or indirectly through an intermediate device) to receive audio and/or video content. For instance, media device identifier 114 and/or storage 126 may be implemented in any sink device or media device hub. Accordingly, implementations are not intended to be limiting to any particular arrangement, and may include any other device arrangement that is not shown in FIGS. 1 and/or FIG. 2.

Figure 2:
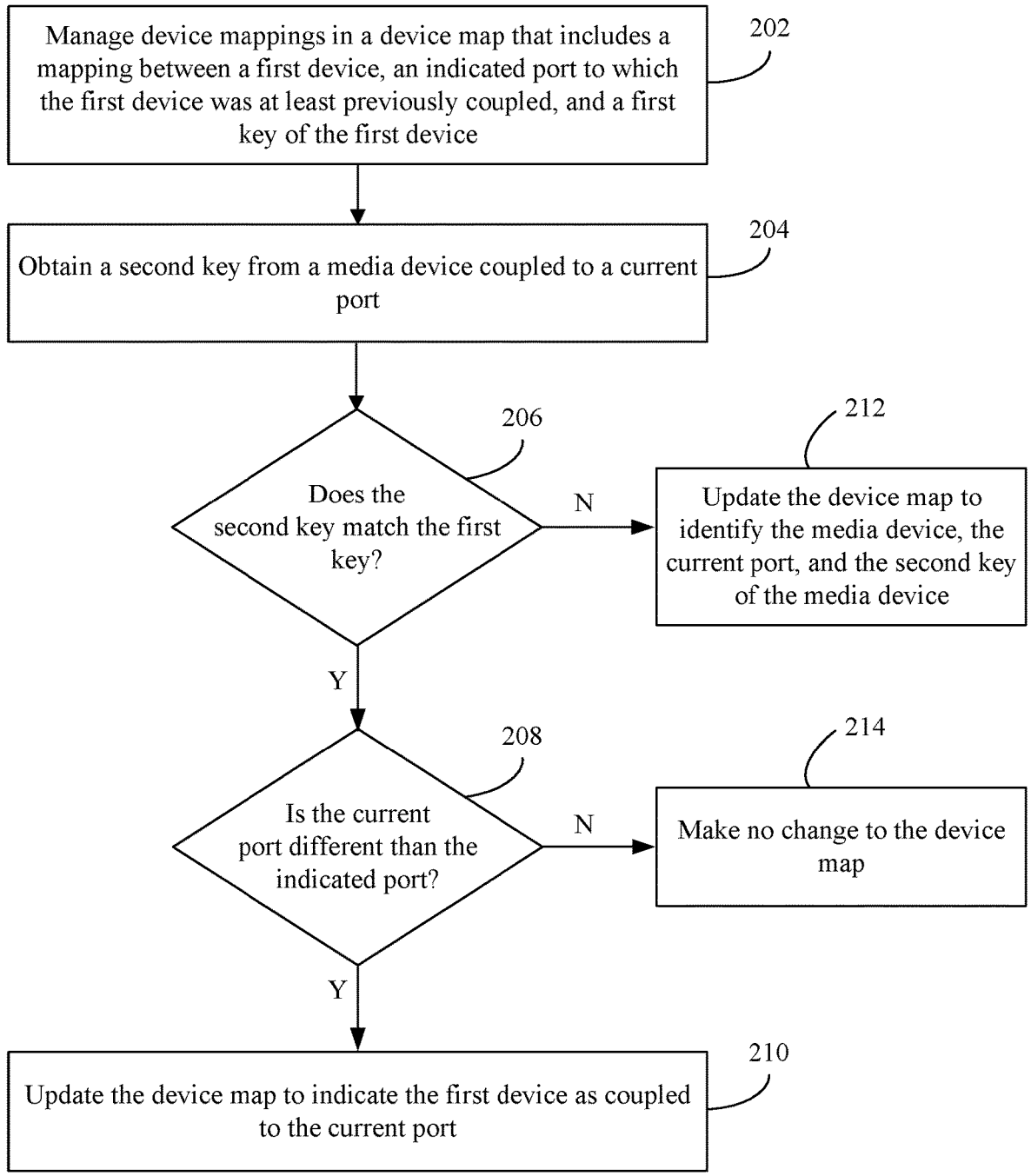
FIG. 2 is a flowchart of a method for identifying a media device coupled to a media device hub, according to an example embodiment.
Figure 3:
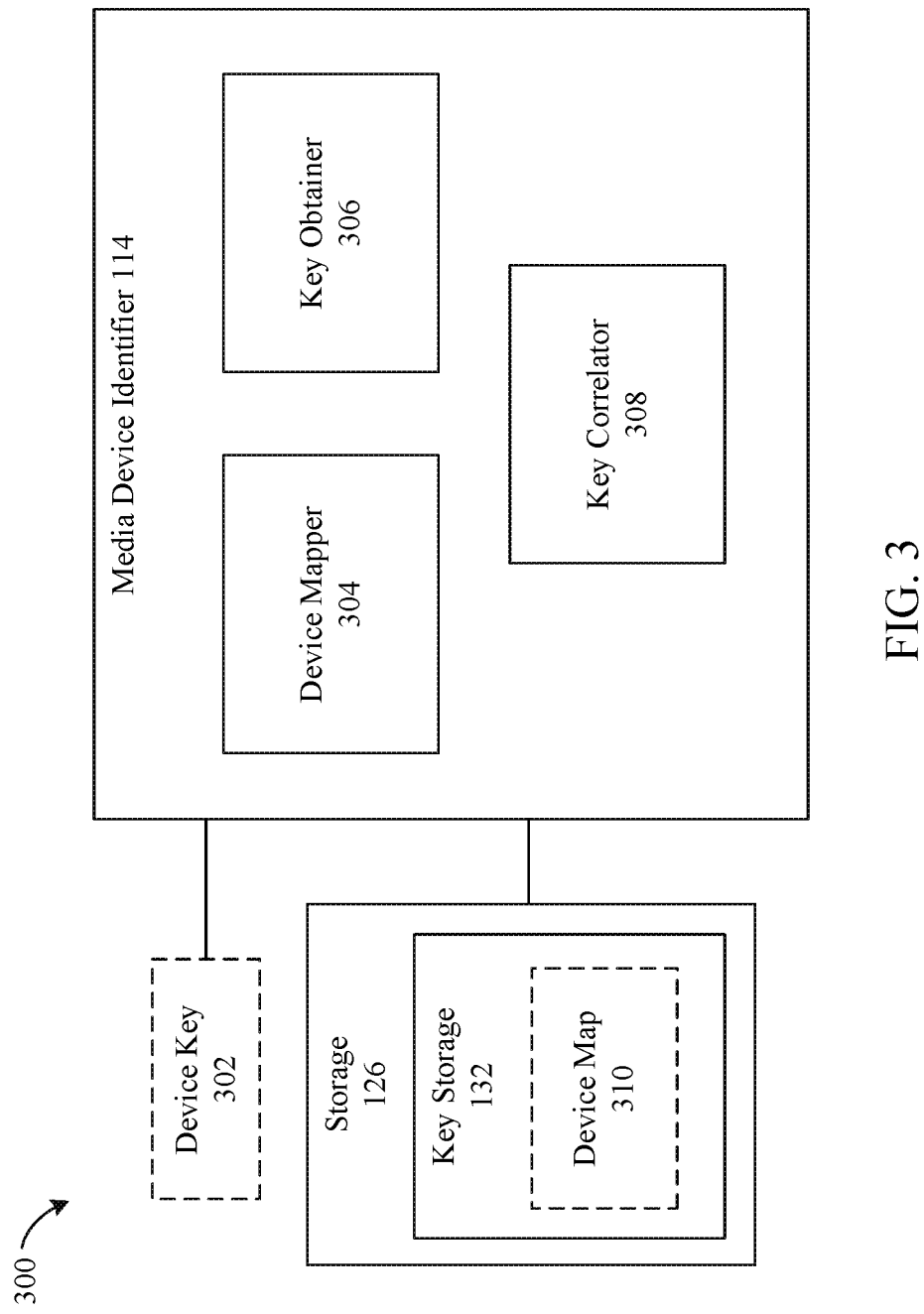
FIG. 3 is a block diagram of a media device identifier, according to an example embodiment.

Media device identifier 114 may operate in various ways to identify a coupled media device using a media device key. For instance, FIG. 2 shows a flowchart 200 of a method for identifying a media device coupled to a media device hub, according to an example embodiment. The method of flowchart 200 will now be described with continued reference to the system of FIG. 1, although the method is not limited to that implementation. For illustrative purposes, flowchart 200 and media device identifier 114 are described as follows with respect to FIG. 3. FIG. 3 shows a block diagram of a system 300 comprising storage 126 and media device identifier 114, according to an example embodiment. As shown in FIG. 3, media device identifier 114 may receive a device key 306, and includes a device mapper 304, a key obtainer 306, and a key correlator 308. Storage 126 includes key storage 132. As shown in FIG. 3, key storage 132 includes a device map 310. Other structural and operational embodiments will be apparent to persons skilled in the relevant art(s) based on the discussion regarding flowchart 200 and the system of FIG. 3. Flowchart 200 and system 300 are described in further detail as follows.

As shown in FIG. 3, the method of flowchart 200 begins at step 202. In step 202, device mappings are managed in a device map that includes a mapping between a first device, an indicated port to which the first device was at least previously coupled, and a first key of the first device. For instance, with reference to FIG. 3, device mapper 304 may be configured to manage device mappings in device map 310. Device map 310 may be stored in a suitable storage, such as key storage 132, that may be local to switching device 104 or located remotely (e.g., on a cloud server). Device map 310 may include a list of map entries that provides mappings between devices coupled to each port of switching device 104. For instance, device mapper 304 may manage device mappings in device map 310 by identifying one or more source media device(s) 102A and one or more sink media device(s) 102B, the respective port of port(s) 110 to which each of the media devices was at least previously coupled, and a key received from the media device. A non-limiting example of a device map in accordance with techniques described herein will be described later with respect to FIGS. 4A and 4B.

Device map 310 may identify the identity of a media device in accordance with any techniques described herein, or described in U.S. patent application Ser. No. 14/945,125, filed on Nov. 18, 2015 and entitled "Automatic Identification and Mapping of Consumer Electronic Devices to Ports on an HDMI Switch." In implementations, the identifier of each media device may comprise a device name, a model number, a serial number, or any other alphanumeric string or phrase that may be used to identify a particular media device among a plurality of coupled devices. In some examples, the identifier may be generated and/or modified through a user interface (not shown), such as an interface through which a user of switching device 104 may manually input or identify, through a remote control, a smartphone, a voice input, a device identifier for one of source media device(s) 102A or sink media device(s) 102B.

The port to which each of source media device(s) 102A or sink media device(s) 102B was at least previously coupled may identify one of port(s) 110 of switching device 104. For instance, if a particular one of source media device(s) 102A was coupled to the first port (e.g., "Port 1") of switching device 104, device map 310 may map the source media device to the first port. In example embodiments, a mapping between a device and the port to which the device was coupled may remain in device map 310 until the device is disconnected or decoupled from switching device 104 and/or reconnected to a different port (as described later). A port identifier may include any combination of integers or letters sufficient to distinguishing one port from another port, such as a port number.

Device map 310 may also identify, for each media device, a key received from the media device (e.g., a first key in this example). For instance, one or more of source media device(s) 102A may be configured to transmit a key, such as an A-key, a transmitter KSV, an AKSV, or any other type of key, from the media device. In examples, an A-key, a transmitter KSV, an AKSV, or the like, may comprise a unique key associated with the media device in accordance with an HDCP certification. In some implementations, such a key may be provided by an appropriate HDCP authority at the time of device manufacture, and may accordingly be stored in each media device that may provide protected or copyrighted content. Upon coupling a media device to switching device 104 (or through a handshake process, described later), an HDCP transmitter of the media device comprising the unique key may be configured to transmit the key to the switching device at a time prior to providing protected content.

In examples, the key may be obtained via one or more control signals or over one or more control channels of HDMI cable 108. For instance, in some examples, the key obtained from a source media device may comprise an HDCP key, or other key related to presentation of protected content, accessible through the source media device. In some implementations, a key stored in device map 310 may comprise an entire device key obtained from a media device, or a subset or predetermined fields of a device key. For instance, device map 310 may be configured to store one or more unique fields or portions of a device key, while not storing other parts that may not be unique to the device. In yet another example, device map 310 may store a key that is generated from an obtained device key, an abbreviation of a device key, a predetermined number of characters of the device key, or any other unique identifier that may be generated or extracted from a received key.

The key is not limited to the examples provided, but may include any other type of key, such as a security a key, an encryption key, a device signature, or a device identifier. In some other examples, the received key may also comprise a serial number or other unique identifier of a media device. Furthermore, although examples are described for mapping a key obtained from one of source media device(s) 102A, implementations also include mapping a key obtained from other devices coupled to switching device 104, such as one or more of sink media device(s) 102B, based on a key received from the sink media device, such as a B-key, a receiver KSV, a BKSV, a unique identifier, serial number, etc. described herein.

Device map 310 may comprise any appropriate data structure for mapping an association between devices coupled to switching device 104, the port to which each device was at least previously coupled, and a key received from each device. For example, device map may include a table, a database, a spreadsheet, etc. for correlating a particular device, port, and key. In some implementations, device map 310 may also be configured to store a flag or other identifier indicating a coupling or handshake status that identifies whether each device is currently coupled to the indicated port. For instance, upon adding or updating an entry in device map 310 (e.g., upon coupling a device and obtaining a device key from the device), a flag may be provided that indicates that the identified port is the current or present port to which the device is coupled. If the device is later disconnected, powered off, or otherwise does not respond during a handshake process between the device and switching device 104, the flag may be changed to indicate an updated device status, such as a disconnection, an indication that the device is powered off, or an indication that a handshake process has was not successful. In this way, device map 310 may thereby be configured to also store an indication regarding the current coupling state of one or more coupled devices. It is noted, however, that implementations are not limited to this example, and device map 310 may be configured to indicate a current or previous coupling status in any other suitable manner, such as storing old and new versions of device map 310, storing a history of coupled devices in a separate data structure in key storage 132, etc.

In step 204, a second key is obtained from a media device coupled to a current port. For instance, with reference to FIGS. 1 and 3, key obtainer 306 may be configured to obtain, from one of source media device(s) 102A, device key 302, via one of port(s) 110 of switching device 104. Device key 302 is an example of device key 108A discussed with reference to FIG. 1, and may include, for example, a key of the source media device as described above, such as a HDCP key, a security key, a serial number, etc. In example implementations, device key 302 (i.e., a second key) of the source media device may be obtained in a similar manner as described above (e.g., via a control signal or over a control channel of HDMI cable 108).

In examples, device key 302 may be obtained in the same or similar format as device keys stored in device map 310. For example, keys stored in device map 310 may each comprise the same structure, length, etc. in some examples. In such scenarios, device key 302 may be obtained such that it comprises the same structure or length so that it may be compared against one or more keys previously stored in device map 310. As an illustrative example, where device map 310 comprises one or more AKSVs (or any other key described herein), device key 302 obtained by key obtainer 306 may similarly comprise an AKSV from the media device coupled to the current port. Implementations are not limited to this illustrative example, however. For instance, where device map 310 is configured to store a device serial number as a device key, key obtainer 306 may be configured to obtain a serial number from a coupled source media device. In this manner, even if devices may not comprise an HDCP key or the like, other device identifiers may be stored such that the device may be uniquely identified in accordance with described techniques.

In step 206, a determination is made whether the second key matches the first key. For instance, with reference to FIG. 3, key correlator 308 may be configured to determine whether the second key (e.g., device key 302 obtained from a media device) matches or correlates to any keys stored in device map 310 that may include a first key. For instance, if the second key is the same as another key (e.g., a first key) stored in device map 310, it may be determined that device key 302 obtained from a media device coupled to a current port of switching device 104 matches a first key. Because device keys, as used herein, may be unique for each device, key correlator 308 may thereby determine whether the media device coupled to the current port of switching device 104 was previously coupled to switching device 104 to either the same port or to a different port. Accordingly, in examples, HDCP information obtained from a source media device (or any other device key) may be utilized to determine whether a source media device was previously connected to another device, such as a switching device (or any other sink device).

If a determination is made that the second key matches the first key in step 206, flowchart 200 proceeds to step 208. If the second key does not match the first key, the flow proceeds to step 212.

In step 208, a determination is made whether the current port is different than the indicated port. For instance, with respect to FIG. 3, key correlator 308 may be configured to determine whether the current port, i.e., the port of port(s) 110 over which the second key was obtained, is different than the indicated port in device map 310 for the same media device. For example, if the second key matches the first key in step 206, it may be determined that the media device was at least previously coupled to the switching device, either to the same port as the current port or to a different port. Because device map 310 indicates, among other things a history of previously coupled devices and the ports to which such devices are coupled, key correlator 308 may compare the current port (e.g., a port number) to the port indicated in device map 310 to determine whether the media device has moved or reconnected to a different port of switching device 104.

If a determination is made that the current port is different than the indicated port in device map 310 in step 208, flowchart 200 proceeds to step 210. If the current port is different than the indicated port, the flow proceeds to step 214.

In step 210, the device map is updated to indicate the first device as coupled to the current port. For instance, with respect to FIG. 3, device mapper 304 may be configured to update or modify device map 310 to indicate that the first device (i.e., one of source media device(s) 102A described earlier) as being coupled to the current port, or the port over which device key 302 was received. In other words, device map 310 is updated to reflect the current coupling status of the first device by updating the new port to which the first device is coupled. Because the first device itself and the associated device key of the first device remain unchanged, the device identifier and the device key need not be modified in implementations when updating device map 310.

As an illustrative example, if device map 310 indicates that a particular source media device was coupled to a first port but the same source media device was later disconnected and recoupled to a second port of the same switching device, device correlator 308 may determine that the same source media device is coupled to a different port, and device mapper 304 may accordingly update device map 310 to reflect the updated coupling. In this manner, manual reconfiguration of switching device 104 to update a device mapping need not be performed. As a result, if a user may disconnect one or more media devices from a switching device implementing aspects described herein and reconnects such devices in a different fashion, the switching device may automatically reconfigure itself to reflect the updated couplings with the devices in a manner that is seamless to the user.

In step 212, if it is determined that the second key does not match the first key, the device map is updated to identify the media device, the current port, and the second key of the media device. For instance, with reference to FIG. 3, since device keys obtained from media devices may be unique, a determination that the second key does not match the first key (i.e., that a key received over a current port does not match any key stored in device map 310) means that the media device coupled to the current port has not been previously coupled to switching device 104. If this determination is made, device mapper 304 may update device map 310 to automatically and/or manually identify the newly coupled device using any of the techniques described herein, the current port of port(s) 110, and the second key (i.e., device key 302) of the media device. In this manner, device map 310 may be continuously updated to reflect the current status of each coupling between switching device 104 and the devices to which it is coupled. If this media device is later disconnected and reconnected, techniques described herein may enable switching device 104 to quickly and automatically determine whether the media device has been reconnected to the same port or a different port, and update device map 310 as appropriate.

In step 214, if it is determined that the current port is not different than the indicated port, no changes are made to the device map. For instance, if it is determined that the current port over which device key 302 was obtained is the same as the port indicated in device map 310, it made be determined that the media device has not moved to a different one of port(s) 110 of switching device 104. Accordingly, since the media device has not moved to a different port, device map 310 need not be updated in such a scenario.

As described above, device map 310 may be updated in various ways upon determining that a source media device has been coupled to a different port of switching device 104. FIGS. 4A and 4B depict illustrative device maps that may indicate a mapping between a port, a device, and a device key. The device maps illustrated in FIGS. 4A and 4B may be implemented in device map 310, although embodiments are not intended to be limiting to the ones shown in FIGS. 4A and 4B. Device maps of FIGS. 4A and 4B are described as follows.

FIG. 4A depicts an illustrative device map 400 in accordance with example embodiments. As shown in FIG. 4, device map 400 includes a list of mappings between a device, a port to which each device is coupled, and a key of each device. In an embodiment, device map 400 includes an entry in the list for each port of the switching device. For instance, the device identifier shown in device map 400 may include a device name, device model, serial number, etc. as described above. Device names (e.g., "Source Device A," "Source Device B", and "Source Device C") as shown in FIG. 4A, may be determined automatically and/or through a user interface. The port number illustrated in FIG. 4A may identify one of port(s) 110 of switching device 104 to which each identified device is coupled. Device map 400 may also comprise a key obtained or generated from each device, which may comprise an HDCP key, an AKSV, a security key, an encryption key, etc. In some implementations, device map 310 may also identify one or more ports (e.g., port 4 in this illustration) that do not have any devices coupled.

FIG. 4B depicts an illustrative device map 402 of the same switching device coupled to the same devices in a different arrangement. In other words, device map 402 is the entity as device map 400 of FIG. 4A, but contains different entries due to different connections of the ports of the switching device with media devices. For instance, in device map 402, Source Device A," "Source Device B", and "Source Device C," each of which comprise the same respective device keys, are coupled to the same switching device as described above with respect to FIG. 4A. Using techniques described herein, however, although the source devices are coupled in a different manner, device map 402 may be automatically updated to reflect the updated coupling arrangement.

As an example, if a user disconnects "Source Device A" from port 1 (which is associated with a device key A123 in this example), as shown in FIG. 4A, and couples the same device to a different port (port 3) of the same switching device, key obtainer 306 may obtain a device key from the device upon connection and/or powering on of the source device. Since device keys are unique to each device, key obtainer 306 may obtain the same device key (A123 in this example) upon connecting "Source Device A" to switching device 104. In this example, key correlator 308 may determine whether the current key matches a key stored in the device map. In this example, since the device map identifies a matching key, key correlator 308 may determine that "Source Device A" was previously coupled to port 1 of switching device 104. Device mapper 304 may automatically and seamlessly update the device map (e.g., as shown in FIG. 4B) to identify "Source Device A" as being coupled to port 3. A similar process may be implemented for the other illustrative devices shown in FIGS. 4A and 4B. In this manner, a user may disconnect one or more devices from a switching device (such as during a relocation of an entire home theater setup to a different room or a different residence) and reconnect the equipment in a different arrangement without having the need to reconfigure switching device 104.

It is noted and understood that device maps 400 and 402 are not intended to be limited to any particular format, structure or arrangement, but are provided only for illustrative purposes. Device maps in accordance with implementations may comprise any suitable mapping which devices, ports, and keys may be associated with each other. Furthermore, although source media devices are depicted in device maps 400 and 402, device maps 400 and 402 may also be configured to map one or more sink media devices in the same maps or in separate maps to implement techniques described above.

It is noted that although the HDCP-based identification techniques are described enabling a switching device (e.g., acting as a sink device in the above example) to automatically determine the identity of another device (e.g., a source device or a sink device) when such device is disconnected and coupled to a different port of switching device 104, the techniques herein are not limited to that illustrative implementation. For instance, other media devices acting as a sink device (e.g., a television or a projector) or a repeater device (e.g., an AVR, a multimedia switching device, a gaming console, etc.) when acting as a sink device may automatically perform such an identification of source media devices (or devices acting as source media devices) by implementing one or more of the components described herein, including but not limited to media device identifier 114 and/or key storage 132.

By way of a non-limiting example, in accordance with embodiments described above, a sink media device (e.g., an HDMI television) may be configured to automatically determine the identity of a source media device (e.g., a streaming media player, such as a Roku® 3 streaming media device) that was previously coupled to a first port (e.g., port 1 of the television) and later disconnected and coupled to a different port (e.g., port 4 of the television). In another embodiment, a media device hub (which may include a repeater device, an AVR, or any other type of media device hub or switching device that may act as a sink media device in some arrangements) may automatically determine the identity of an HDMI source device (e.g., a streaming media player) when the source device is disconnected from a first port (e.g., port 2) and later coupled to a different port (e.g., port 3) in a similar manner by implementing the components described herein. In yet another example, an HDMI sink device (e.g., a display device) may utilize the above techniques to automatically determine the identity of a repeater HDMI device (e.g., a media device hub, such as AVR, that may act as a source media device) when the repeater HDMI device is disconnected from a first HDMI port (e.g., port 1 of the television) and later connected to a different port (e.g., port 2 of the television). In accordance with yet another embodiment, a repeater HDMI device (e.g., a media device hub, such as an AVR or other hub or switching device acting as a sink device) may implement the features described herein to automatically identify another repeater HDMI device acting as a source device (e.g., a gaming console such as an Xbox® gaming console) when the gaming console is unplugged from a first port (e.g., port 2 of the AVR) and later coupled to a different port of the repeater HDMI device (e.g., port 1). Accordingly, irrespective of the particular combination or configuration of source devices, sink devices, media device hubs, etc. in a system, the components described herein may be implemented to automatically determine the identity of a device using HDCP information (or other unique identifying information described herein) received from a media device.

Figure 5:
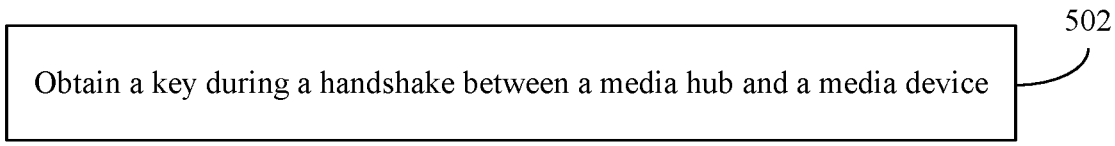
FIG. 5 is a flowchart of a method for obtaining a key during a handshake process, according to an example embodiment.

As discussed above, key obtainer 306 may obtain a device key from a coupled device in various ways. For instance, FIG. 5 is a flowchart of a method for obtaining a key during a handshake process, according to an example embodiment. For illustrative purposes, FIG. 5 will be described with continued reference to system 100 and 300 of FIGS. 1 and 3, respectively. Other structural and operational embodiments will be apparent to persons skilled in the relevant art(s) based on the discussion regarding flowchart 500 and the systems of FIGS. 1 and 3. Flowchart 500 and systems 100 and 300 are described in further detail as follows.

Flowchart 500 begins with step 502. In step 502, a device key is obtained during a handshake between a media device hub and a media device. For instance, with reference to FIG. 3, key obtainer 306 may be configured to obtain device key

302 from one of source media device(s) 102A during a handshake between two HDCP-compliant devices, such as a source media device and switching device 104. In examples, the handshake may comprise an HDCP handshake in which an HDCP transmitter of switching device 104 and an HDCP transmitter of the source media device exchange their respective device keys. For instance, a transmitter of switching device 104 may be configured to transmit the appropriate sink device key (such as a B-key, a receiver KSV, or a BKSV) to the coupled source media device. Similarly, a transmitter of the source media device may be configured to transmit its device key (such as an A-key, a transmitter KSV, or an AKSV) to switching device 104. Based on the exchange of such keys, protected or copyrighted content that may be accessible via the source media device may be communicated to a sink device for presentation and/or playback.

In some implementations, the handshake may be performed at various times. For instance, the handshake of device keys may be performed each time a device is physically coupled to switching device 104. In other examples, the handshake may be performed each time a coupled media device and/or switching device 104 is powered on. In yet another implementation, the handshake may be performed periodically at predetermine intervals (e.g., every 5 minutes, 30 minutes, hour, etc.) or aperiodically.

In accordance with techniques, each time a handshake occurs in which keys are exchanged, media device identifier 114 may be configured to determine whether device map 310 reflects the current mapping of devices and ports for switching device 104. If key obtainer 306 obtains a device key from one of port(s) 110 that does not match, or is otherwise inconsistent with, the information stored in device map 310, device mapper 304 may appropriately update the device map to identify the currently coupled devices and ports to which the devices are coupled.

Figure 6:
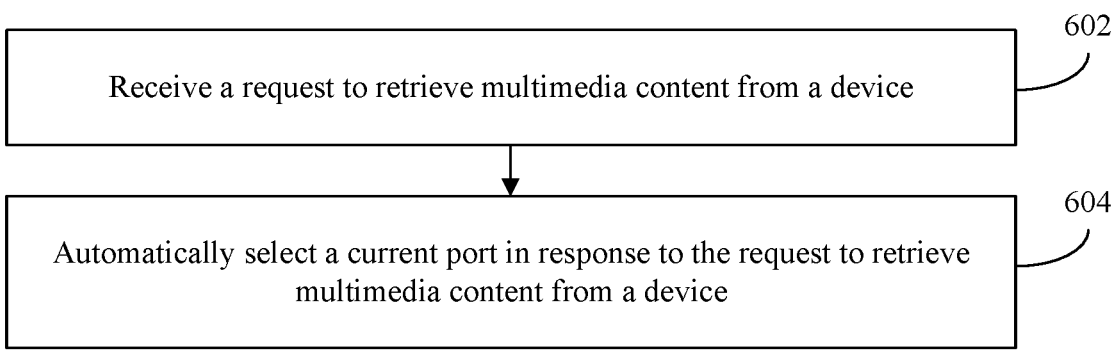
FIG. 6 is a flowchart of a method automatically selecting a current port instead of a port previously indicated in the device map to retrieve multimedia content, according to an example embodiment.

As discussed above, device mapper 304 may automatically update device map 310 based on a device key obtained from one or more coupled source media devices. FIG. 6 is a flowchart of a method for automatically selecting a current port instead of a port previously indicated in the device map to retrieve multimedia content, according to an example embodiment. For illustrative purposes, FIG. 6 will be described with continued reference to system 100 and 300 of FIGS. 1 and 3, respectively. Other structural and operational embodiments will be apparent to persons skilled in the relevant art(s) based on the discussion regarding flowchart 600 and the systems of FIGS. 1 and 3. Flowchart 600 and systems 100 and 300 are described in further detail as follows.

Flowchart 600 begins with step 602. In step 602, a request is received to retrieve multimedia content from a device. For instance, a receiver of switching device 104 may receive a command, including but not limited to a remote-control command, a command via a smartphone, a voice command, etc. to retrieve multimedia content from one of source media device(s) 102A coupled to switching device 104. For example, using device map 402 as an illustration, if a user desires to view multimedia content from "Source Device A" (e.g., one of source media device(s) 102A), a user may provide a command to a receiver of switching device 104 to present content from "Source Device A" by transmitting a remote-control command selecting "Source Device A" or stating "Watch Source Device A."

In some other examples, a user need not identify the device by a device identifier but may also identify multimedia content accessible via the source media device. For instance, the command to retrieve multimedia content may identify the multimedia content by a show or movie title, a program name, an application that may be launched on the source media device, etc. Implementations are not limited, and may include selecting a source media device for retrieving content in any other suitable manner.

In step 604, a current port is automatically selected in response to the request to retrieve multimedia content from the device. For instance, with reference to FIG. 1, switch circuit 106 may utilize device map to automatically switch an input and/or output port of switching device 104 to retrieve multimedia content from a desired source device and/or present such content to a desired sink device. As discussed above, switch circuit 106 may automatically select the appropriate port as the input port for retrieving multimedia content from "Source Device A" in response to a command to retrieve multimedia content from this source device, and present such content on the appropriate sink device (e.g., a TV or a projector).

For instance, if switching device 104 comprised a device map as shown in FIG. 4A, switch circuit 106 may automatically select Port 1 as an input port corresponding to "Source Device A." However, as described above, if one or more couplings in system 100 are altered such that "Source Device A" is no longer coupled to Port 1 but is instead coupled to Port 3 (e.g., as shown in device map 402 of FIG. 4B), switch circuit 106 may be configured to automatically select the current port instead of the port indicated in the prior device map, in response to the request to retrieve multimedia content from "Source Device A." In this manner, switch circuit 106 may automatically select the correct port corresponding to the desired input device, even if such a device is disconnected and reconnected to a different port of switching device 104.

III. Further Example Embodiments and Advantages

One or more embodiments described herein may perform their functions according to the flowcharts described herein. Additional structural and operational embodiments will be apparent to persons skilled in the relevant art(s) based on the discussions regarding the flowcharts and embodiments herein. In some example embodiments, one or more of the steps of the described flowcharts may not be performed. Moreover, steps in addition to or in lieu of the steps of the described flowcharts may be performed (some of which were described above). Further, in some example embodiments, one or more of the steps of the described flowcharts may be performed out of the order shown or described, in an alternate sequence, and/or partially (or completely) concurrently with other steps.

The device identification embodiments and/or any further systems, sub-systems, devices and/or components disclosed herein may be implemented in hardware (e.g., hardware logic/electrical circuitry), or any combination of hardware with software (computer program code configured to be executed in one or more processors or processing devices) and/or firmware.

Figure 7:
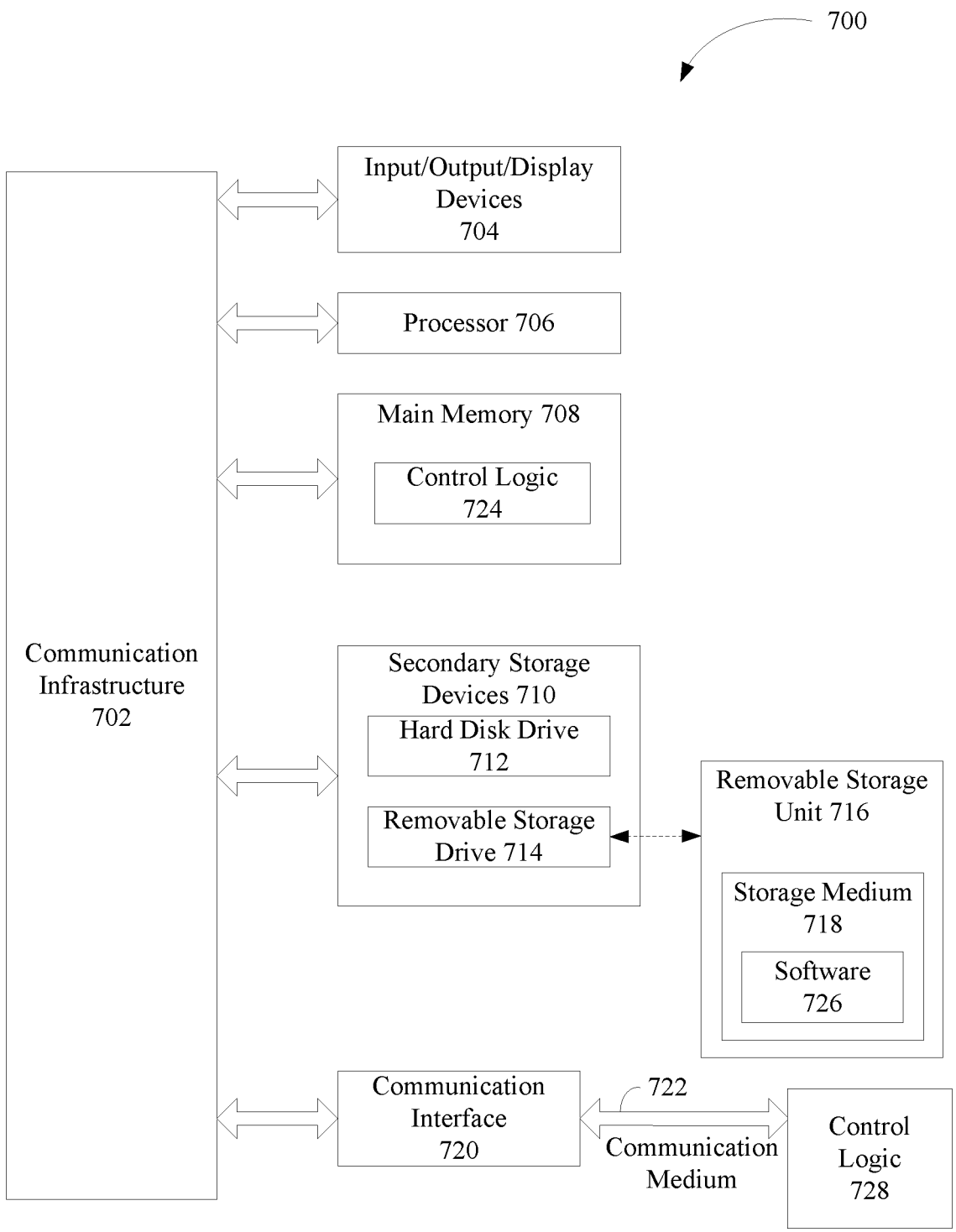
FIG. 7 is a block diagram of an example computer system in which embodiments may be implemented.

The embodiments described herein, including systems, methods/processes, devices, and/or apparatuses, may be implemented using well known processing devices, telephones (smart phones and/or mobile phones), tablet computers, servers, and/or, computers, such as a computer 700 shown in FIG. 7. It should be noted that computer 700 may represent communication devices, processing devices, servers, and/or traditional computers in one or more embodiments. For example, the device identification embodiments, and any of the sub-systems or components respectively contained therein, may be implemented using one or more computers 700 or portions thereof.

Computer 700 can be any commercially available and well-known communication device, processing device, and/or computer capable of performing the functions described herein, such as devices/computers available from International Business Machines®, Apple®, Sun®, HP®, Dell®, Cray®, Samsung®, Nokia®, etc. Computer 700 may be any type of computer, including a desktop computer, a server, etc.

Computer 700 includes one or more processors (also called central processing units, or CPUs), such as a processor 706. Processor 706 is connected to a communication infrastructure 702, such as a communication bus. In some embodiments, processor 706 can simultaneously operate multiple computing threads.

Computer 700 also includes a primary or main memory 708, such as random-access memory (RAM). Main memory 708 has stored therein control logic 724 (computer software), and data.

Computer 700 also includes one or more secondary storage devices 710. Secondary storage devices 710 include, for example, a hard disk drive 712 and/or a removable storage device or drive 714, as well as other types of storage devices, such as memory cards and memory sticks. For instance, computer 700 may include an industry standard interface, such a universal serial bus (USB) interface for interfacing with devices such as a memory stick. Removable storage drive 714 represents a floppy disk drive, a magnetic tape drive, a compact disk drive, an optical storage device, tape backup, etc.

Removable storage drive 714 interacts with a removable storage unit 716. Removable storage unit 716 includes a computer useable or readable storage medium 718 having stored therein computer software 726 (control logic) and/or data. Removable storage unit 716 represents a floppy disk, magnetic tape, compact disk, DVD, optical storage disk, or any other computer data storage device. Removable storage drive 714 reads from and/or writes to removable storage unit 716 in a well-known manner.

Computer 700 also includes input/output/display devices 704, such as touchscreens, LED and LCD displays, monitors, keyboards, pointing devices, etc.

Computer 700 further includes a communication or network interface 718. Communication interface 720 enables computer 700 to communicate with remote devices. For example, communication interface 720 allows computer 700 to communicate over communication networks or mediums 722 (representing a form of a computer useable or readable medium), such as LANs, WANs, the Internet, etc. Network interface 720 may interface with remote sites or networks via wired or wireless connections.

Control logic 728 may be transmitted to and from computer 700 via the communication medium 722.

Any apparatus or manufacture comprising a computer useable or readable medium having control logic (software) stored therein is referred to herein as a computer program product or program storage device. This includes, but is not limited to, computer 700, main memory 708, secondary storage devices 710, and removable storage unit 716. Such computer program products, having control logic stored therein that, when executed by one or more data processing devices, cause such data processing devices to operate as described herein, represent embodiments.

Techniques, including methods, and embodiments described herein may be implemented by hardware (digital and/or analog) or a combination of hardware with one or both of software and/or firmware. Techniques described herein may be implemented by one or more components. Embodiments may comprise computer program products comprising logic (e.g., in the form of program code or software as well as firmware) stored on any computer useable medium, which may be integrated in or separate from other components. Such program code, when executed by one or more processor circuits, causes a device to operate as described herein. Devices in which embodiments may be implemented may include storage, such as storage drives, memory devices, and further types of physical hardware computer-readable storage media. Examples of such computer-readable storage media include, a hard disk, a removable magnetic disk, a removable optical disk, flash memory cards, digital video disks, random access memories (RAMs), read only memories (ROM), and other types of physical hardware storage media. In greater detail, examples of such computer-readable storage media include, but are not limited to, a hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nanotechnology-based storage devices, flash memory cards, digital video discs, RAM devices, ROM devices, and further types of physical hardware storage media. Such computer-readable storage media may, for example, store computer program logic, e.g., program modules, comprising computer executable instructions that, when executed by one or more processor circuits, provide and/or maintain one or more aspects of functionality described herein with reference to the figures, as well as any and all components, capabilities, and functions therein and/or further embodiments described herein.

Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, IR, and other wireless media, as well as wired media and signals transmitted over wired media. Embodiments are also directed to such communication media.

The techniques and embodiments described herein may be implemented as, or in, various types of devices. For instance, embodiments may be included, without limitation, in processing devices (e.g., illustrated in FIG. 7) such as computers and servers, as well as communication systems such as switches, routers, gateways, and/or the like, communication devices such as smart phones, home electronics, gaming consoles, entertainment devices/systems, etc. A device, as defined herein, is a machine or manufacture as defined by 35 U.S.C. § 101. That is, as used herein, the term "device" refers to a machine or other tangible, manufactured object and excludes software and signals. Devices may include digital circuits, analog circuits, or a combination thereof. Devices may include one or more processor circuits (e.g., central processing units (CPUs), processor 706 of FIG. 7), microprocessors, digital signal processors (DSPs), and further types of physical hardware processor circuits) and/or may be implemented with any semiconductor technology in a semiconductor material, including one or more of a Bipolar Junction Transistor (BJT), a heterojunction bipolar transistor (HBT), a metal oxide field effect transistor (MOS- FET) device, a metal semiconductor field effect transistor (MESFET) or other transconductor or transistor technology device. Such devices may use the same or alternative configurations other than the configuration illustrated in embodiments presented herein.

It is noted that while FIG. 7 shows a server/computer, persons skilled in the relevant art(s) would understand that embodiments/features described herein could also be implemented using other well-known processor-based computing devices, including but not limited to, smart phones, tablet computers, netbooks, gaming consoles, personal media players, and the like.

IV. Conclusion

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. A media device hub comprising:
   a plurality of High-Definition Multimedia Interface (HDMI) ports;
   a device mapper configured to manage device mappings in a device map, the device map including a mapping between a first device that was previously coupled to and disconnected from the media device hub, an indicated port of the plurality of HDMI ports to which the first device was at least previously coupled, and a first key of the first device;
   a key obtainer configured to obtain, upon coupling a media device to the media device hub, a second key from the media device coupled to a current port of the plurality of HDMI ports; and
   a key correlator configured to:
      determine whether the second key matches the first key;
      in response to determining that the second key matches the first key, determine whether the current port is different than the indicated port; and
      in response to determining that the current port is different than the indicated port, update the device map to indicate the first device as coupled to the current port.

2. The media device hub of claim 1, wherein the first key comprises at least one of security a key, an encryption key, a device signature, or a device identifier.

3. The media device hub of claim 1, wherein:
   the first key comprises a key selection vector (KSV) received from a High-bandwidth Digital Content Protection (HDCP) transmitter of the first device.

4. The media device hub of claim 1, wherein the key obtainer is configured to obtain the first key and the second key over a first HDMI port and a second HDMI port, respectively.

5. The media device hub of claim 1, wherein the first device is a source media device configured to provide multimedia content to a sink device.

6. The media device hub of claim 5, further comprising:
   a switch circuit that is configured to automatically select the current port instead of the indicated port in response to a request to retrieve the multimedia content from the first device.

7. The media device hub of claim 1, wherein the key obtainer is configured to obtain the second key during a handshake between the media device hub and the media device.

8. A method for identifying a coupled device, the method comprising:
   managing device mappings in a device map, the device map including a mapping between a first device that was previously coupled to and disconnected from the media device hub, an indicated port among a plurality of High-Definition Multimedia Interface (HDMI) ports to which the first device was at least previously coupled, and a first key of the first device;
   obtaining, upon coupling a media device to the media device hub, a second key from the media device coupled to a current port of the plurality of HDMI ports;
   determining whether the second key matches the first key;
   in response to determining that the second key matches the first key, determining whether the current port is different than the indicated port; and
   in response to determining that the current port is different than the indicated port, updating the device map to indicate the first device as coupled to the current port.

9. The method of claim 8, wherein the first key comprises at least one of a security key, an encryption key, a device signature, or a device identifier.

10. The method of claim 8, wherein:
    the first key comprises a key selection vector (KSV) received from a High-bandwidth Digital Content Protection (HDCP) transmitter of the first device.

11. The method of claim 8, further comprising:
    obtaining the first key and the second key over a first HDMI port and a second HDMI port, respectively.

12. The method of claim 8, wherein the first device is a source media device configured to provide multimedia content to a sink device.

13. The method of claim 12, further comprising:
    receiving a request to retrieve multimedia content from the first device; and
    automatically selecting the current port instead of the indicated port in response to the request to retrieve the multimedia content.

14. The method of claim 8, wherein said obtaining the second key comprises:
    obtaining the second key during a handshake between a media device hub and the media device.

15. A system comprising:
    a plurality of High-Definition Multimedia Interface (HDMI) ports; and
    one or more processing components to automatically identify a coupled device, the automatic identification of the coupled device performed by:
       managing device mappings in a device map, the device map including a mapping between a first device that was previously coupled to and disconnected from the media device hub, an indicated port among the plurality of HDMI ports to which the first device was at least previously coupled, and a first key of the first device;
       obtaining, upon coupling a media device to the media device hub, a second key from the media device coupled to a current port of the plurality of HDMI ports;
       determining whether the second key matches the first key;

in response to determining that the second key matches the first key, determining whether the indicated port is different than the current port; and in response to determining that the current port is different than the indicated port, updating the device map to indicate the first device as coupled to the current port.

16. The system of claim 15, wherein:
the first key comprises a key selection vector (KSV) received from a High-bandwidth Digital Content Protection (HDCP) transmitter of the first device.

17. The system of claim 15, wherein the one or more processing components are further configured to:
obtain the first key and the second key over a first HDMI port and a second HDMI port, respectively.

18. The system of claim 15, wherein the first device is a source media device configured to provide multimedia content to a sink device.

19. The system of claim 18, wherein the one or more processing components are further configured to:
receive a request to retrieve multimedia content from the first device; and
automatically select the current port instead of the indicated port in response to the request to retrieve the multimedia content.

20. The system of claim 15, wherein said obtaining a second key comprises:
obtaining the second key during a handshake between a media device hub and the media device.

* * * * *

UNITED STATES PATENT AND TRADEMARK OFFICE
CERTIFICATE OF CORRECTION

PATENT NO. : 10,904,477 B2  
APPLICATION NO. : 16/250791  
DATED : January 26, 2021  
INVENTOR(S) : Ashish D. Aggarwal et al.

Page 1 of 1

It is certified that error appears in the above-identified patent and that said Letters Patent is hereby corrected as shown below:

In the Claims

In Column 19, Line 50, in Claim 2, delete "security a" and insert -- a security --, therefor.

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*